(12) United States Patent
Kramer et al.

(10) Patent No.: US 7,963,170 B2
(45) Date of Patent: Jun. 21, 2011

(54) PRESSURE SENSOR

(75) Inventors: Axel Kramer, Wettingen (CH); Frank Kassubek, Rheinfelden (DE); Klaus Bohnert, Oberrohrdorf (CH); Hubert Braendle, Oberengstringen (CH)

(73) Assignee: ABB Research Ltd, Zurich (CH)

( * ) Notice: Subject to any disclaimer, the term of this patent is extended or adjusted under 35 U.S.C. 154(b) by 0 days.

(21) Appl. No.: 12/684,559

(22) Filed: Jan. 8, 2010

(65) Prior Publication Data

US 2010/0180686 A1      Jul. 22, 2010

Related U.S. Application Data

(63) Continuation of application No. PCT/EP2007/056969, filed on Jul. 9, 2007.

(51) Int. Cl.
*G01L 13/02* (2006.01)
(52) U.S. Cl. ............................... 73/736; 73/705; 73/800
(58) Field of Classification Search .................. None
See application file for complete search history.

(56) References Cited

U.S. PATENT DOCUMENTS

| 5,009,107 | A |   | 4/1991 | Grasdepot |   |
|---|---|---|---|---|---|
| 5,022,045 | A | * | 6/1991 | Elliott | 374/20 |
| 5,515,459 | A |   | 5/1996 | Farhadiroushan |   |
| 5,561,522 | A | * | 10/1996 | Rapoport et al. | 356/477 |
| 6,208,776 | B1 | * | 3/2001 | Prohaska et al. | 385/13 |
| 6,513,390 | B1 | * | 2/2003 | De La Puente et al. | 73/800 |
| 6,597,821 | B1 |   | 7/2003 | Bohnert et al. |   |
| 6,647,800 | B2 | * | 11/2003 | De La Puente et al. | 73/800 |

FOREIGN PATENT DOCUMENTS

GB      2 419 401 A      4/2006

OTHER PUBLICATIONS

International Search Report of Application No. PCT/EP2007/056969 dated May 8, 2008.
Written Opinion of the International Searching Authority of Application No. PCT/EP2007/056969 dated May 8, 2008.
J. P. Dakin et al. "Compensated Polarimetric Sensor Using Polarisation-Maintaining Fibre in a Differential Configuration", Electronics Letters, Jan. 5, 1984, vol. 20, No. 1, pp. 51-53.
International Preliminary Report on Patentability (Form PCT/IB/373) issued by the International Bureau of WIPO, Jan. 12, 2010, and accompanying Written Opinion (Form PCT/ISA/237) issued by the European Patent Office.
Föppl, L.—Monch, E., *Praktische Sbannungsoptik*, Jun. 20, 1972, 3rd Edition, title page, Forward and Table of Contents, Springer-Verlag, Berlin/Heidelberg, DE.

* cited by examiner

*Primary Examiner* — Lisa M Caputo
*Assistant Examiner* — Jermaine Jenkins
(74) *Attorney, Agent, or Firm* — Buchanan Ingersoll & Rooney PC

(57) ABSTRACT

A pressure sensor is disclosed wherein pressure induced changes in birefringent properties of an optical sensing element are read out by transmission of at least one light beam. The pressure sensor can include at least one single-material transparent body which is subjected to at least two different pressures (p1, p2) in at least two different regions via at least two pressure chambers. The transparent body can transmit by a parallel or minimally divergent light beam without total reflection in the body such that the pressure-induced birefringence and a corresponding differential phase shift between linear polarisation components of the light beam depends on a difference of the different pressures (p1, p2).

22 Claims, 9 Drawing Sheets

PRESSURE SENSOR

RELATED APPLICATIONS

This application claims priority as a continuation application under 35 U.S.C. §120 to PCT/EP2007/056969 filed as an International Application on Jul. 9, 2007 designating the U.S., the entire content of which is hereby incorporated by reference in its entirety.

FIELD

The present application pertains to the field of pressure sensing based on pressure induced changes, for example, in birefringence of transparent bodies.

BACKGROUND INFORMATION

There are numerous ways to measure pressure by optical means: Fabry Perot and Fibre-Bragg gratings technologies, Raman Scattering, Brillouin scattering, membrane integrated waveguides, mechanical resonant oscillators, evanescent field coupling or photonic crystals. The technology includes use of birefringence induced by inhomogeneous stress distributions for the measurement of pressure.

The use of birefringence for estimating stress distribution is called "photoelasticity". It was developed at the beginning of last century and is well established. For example, thin plates of glass or plastic are exposed to external forces and the stress distribution inside the plates can be determined from the fringe pattern created by transmitted polarized light with help of a perpendicular polarization filter. Details of this method can be found, e.g., in the textbook of Föppl and Mönch (L. Föppl, E. Mönch, Praktische Spannungsoptik, Springer, Berlin 1972), the disclosure of which is hereby incorporated by reference in its entirety.

The use of the birefringence effect in structured fibres with fibre core for measuring pressure was known at least in mid 1980. More detailed studies have followed more than a decade later. The geometry and temperature dependence of the effect, stability with respect to environmental influences and ageing and detection setups have been investigated.

The temperature sensitivity of inherent birefringence is at least an order of magnitude greater than that of pressure dependent birefringence, and so there can be considerable advantage in minimizing an inherent temperature component or contribution to birefringence. If two lengths of fiber are made identical and the fibres are rotated 90° relative to one another about their longitudinal axis at the joint or splice, as taught by Dakin and Wade (J. P. Dakin and C. Wade, "Compensated polarimetric sensor using polarisation-maintaining fibre in a differential configuration", Electron. Lett., Vol. 20, No. 1, pp. 51-53, 1984), then the inherent birefringence in the two parts is identical, and if the two parts are subject to the same pressure conditions also the pressure dependent birefringence cancels. So, if the two pieces of fibre core with a cladding are identically sensitive to pressure, a useful signal will be obtained if the two pieces of fibre experience different pressures. This is the approach taught by Dakin and Wade. By this kind of setup, one may minimise the temperature dependence of the measured pressure-induced phase shift.

There is an alternative approach in which a useful signal can be obtained when the two pieces of fibre experience the same pressure from the exterior. If the pressure dependent birefringence is made not equal in the two parts and yet the inherent birefringence is the same in the two parts, the pressure in the two parts may be equal, that is the two pieces of fibre may experience the same pressure, and yet temperature compensation of the inherent birefringence still occurs. This is the basis for the concept as disclosed in U.S. Pat. No. 5,515,459, where the pressure induced birefringence is made to differ by admitting the external pressure selectively to some of the side-holes formed in the fibre.

Reference is also made to GB 2 419 401 A, in which a fiber with a light guiding core and a cladding is used for differential pressure measurement, and wherein one single pressure is applied to the device in both sensing parts in order to allow overall differential measurement with biasing portion optically coupled in series with the two sensing parts.

The disclosures of all of the foregoing documents are incorporated by reference in their entireties.

SUMMARY

A pressure sensor is disclosed with at least one optical sensing element for sensing the pressure induced changes in birefringent properties of the optical sensing element, wherein the pressure sensor comprises: at least one single-material transparent body having at least two different regions for subjecting at least two different pressures (p1, p2) to at least two pressure chambers, the transparent body being configured for transmitting by a parallel or essentially non-divergent or low-divergent light beam without total reflection in said body such that a birefringence-induced phase shift of a transmitted light beam will depend on a difference of the two different pressures (p1, p2).

A method is disclosed for detecting a pressure using a pressure sensor with at least one optical sensing element to sense pressure induced changes in birefringent properties of the optical sensing element, the method comprising: subjecting at least one single material, transparent body to at least two different pressures (p1, p2) in at least two different regions via at least two pressure chambers; transmitting a light beam to the transparent body by a parallel or minimally divergent light beam without total reflection in said body such that a birefringence-induced phase shift of the light beam depends on a difference of the two different pressures (p1, p2); and revaluating differential pressure in the two pressure chambers, based on at least one of a sum or difference output of these detectors, and a ratio of the output of these detectors.

BRIEF DESCRIPTION OF THE DRAWINGS

In the accompanying drawings, exemplary embodiments and/or documentary evidence in support of exemplary embodiments are shown in which.

DETAILED DESCRIPTION

Figure 1:
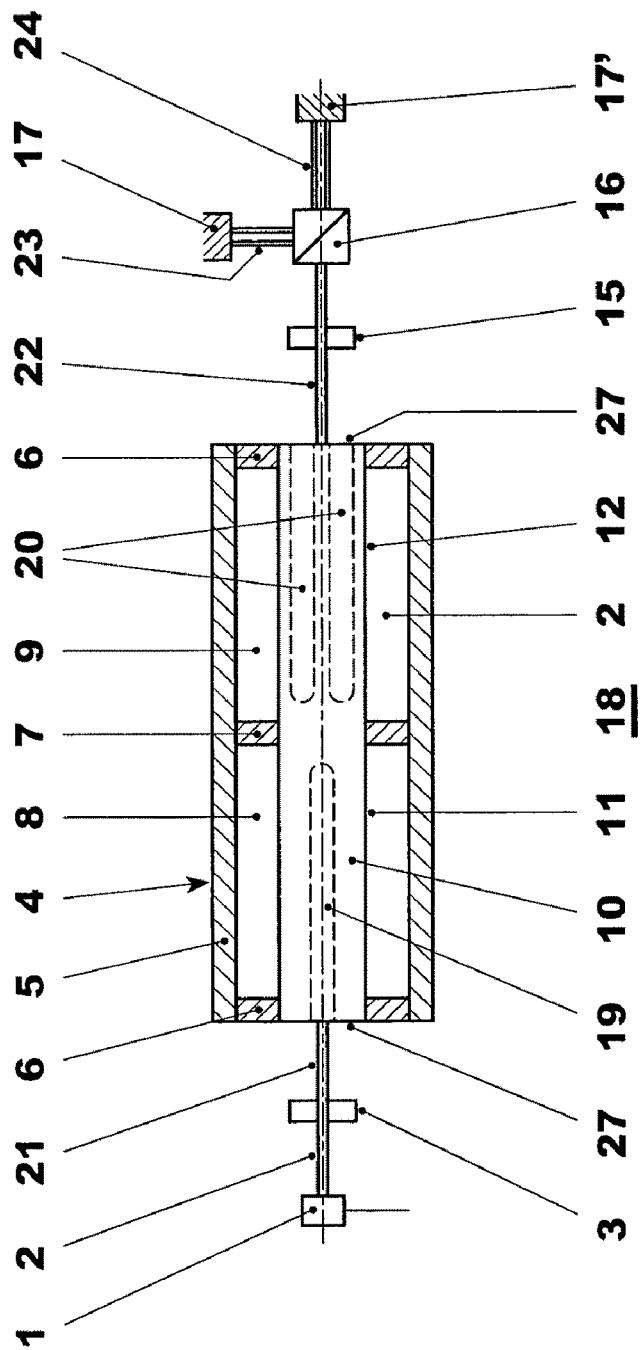
FIG. 1 shows an exemplary differential pressure sensor made from two structured glass bodies.
Figure 1:
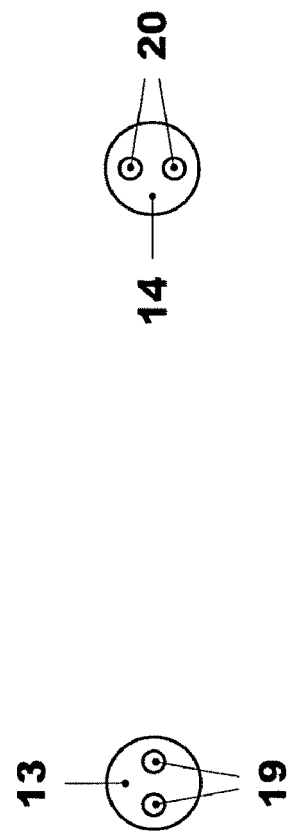

A pressure sensor assembly is disclosed with at least one optically transparent pressure sensing element, the pressure induced changes in the optical birefringence properties of which are read out by illumination with at least one light beam. An exemplary (differential) pressure sensor is disclosed which can achieve high accuracy and low errors which are caused, for example, by temperature effects.

In an exemplary pressure sensor with at least one optical sensing element, pressure induced changes in the birefringent properties of the sensing element are read out by transmission of at least one light beam. An exemplary pressure sensor includes at least one single-material transparent body (i.e. having a uniform material throughout the body), wherein for example the transparent body includes (e.g., consists of) one single-material transparent body, which body is subjected to at least two different pressures in at least two different regions via at least two pressure chambers, wherein the transparent body can transmit by a parallel or minimally divergent light beam without total (internal) reflection in or at interfaces of the body, such that the birefringence of a transmitted light beam depends on the difference of the different pressures, or stated differently: such that the birefringence-induced phase shift of the transmitted light beam depends on the difference of the applied pressures, or stated even further differently: such that a pressure-induced birefringence and the corresponding differential phase shift between linear polarisation components of this light beam depend on the difference of the applied pressures.

Known optical fibres as used in the state-of-the-art for these purposes can possess sections which are made of two different materials, a light guiding core and a cladding. In the light guiding core the light beam used for the measurement is "caught" in this core by the total reflection of the light at the bordering interfaces of the guiding core. So is, for example, the fiber in the disclosure of Dakin and Wade, as otherwise it could not be wound around a deformable cylinder as suggested therein. The light guiding core and a cladding in the systems therefore constitute the pressure sensing element together and this pressure sensing element is not made of a single material, as the light guiding core and the cladding are not made of the same material. These regions (core and cladding) can exhibit different thermal expansion behaviour. This fact leads to unwanted stress distributions upon temperature change, which can lead to wrong signals. It was correspondingly found that known systems according to the state-of-the-art which used a known fiber with a cladding do not allow high accuracy pressure measurements. Using a sensor made of homogeneous single material, i.e. a sensor without a light guiding core as proposed in the present disclosure, can unexpectedly and highly efficiently avoid crosstalk from such temperature induced effects.

Regarding signal readout, the signal of the systems described in literature are based on fringe counting. In contrast, an exemplary system as disclosed herein can advantageously use a signal range which is based on a phase shift between $-\pi/2$ and $\pi/2$. Thus, an unambiguous monotonous pressure-signal relation can be guaranteed. So in contrast to known systems, no light guiding core with a cladding is used in exemplary embodiments disclosed herein, so there is no multi-component sensor in which the central core guides the light by total reflection at interfaces. Correspondingly, therefore, a light beam according to the present disclosure is parallel or minimally divergent upon entering into the sensor. The light beam entering and transmitted through the sensor is therefore a parallel or minimally divergent light beam, which is, for example, linearly polarised.

Such a pressure sensor can, for example, be used for the measurement of pressure differences above 500 mbar, such as above 0.5 bar up to 15 bar or lesser or greater.

According to a first exemplary embodiment of the disclosure, the transparent body can be directly subjected to the at least two different pressures, so the pressure chamber or the medium present in the pressure chamber is immediately adjacent to the transparent body. It is however also possible that the transparent body may comprise a coating or the like for increasing the e.g chemical or overpressure resistance against the medium present in the pressure chamber.

In a further exemplary embodiment of the present disclosure the transparent body is a cylindrical body. The cylindrical body can have a circular cross-section. It may however also have a polygonal cross-section, e.g. a regular hexagonal, octagonal etc. cross-section. For the measurement of the pressure difference the transparent cylindrical body can be subjected to at least two different pressures in at least two different regions. The cylindrical body can be subjected for this purpose to two-different pressures in two (or more) longitudinally subsequent parts, wherein at first there is the first part in which the cylindrical body is (usually circumferentially) exposed to a first pressure, and then as one travels along the longitudinal axis of the cylindrical body, there is a second part in which the cylindrical body is (for example, circumferentially) exposed to a second pressure. Alternatively or in addition to that, the cylindrical body can be subjected to two different pressures in four (or more) equiangular, alternating pressure sections along the full (or partial) length of the body. In this latter case, the cylindrical body can be exposed to the first pressure from top and bottom, and to the second pressure from left and right in a fully symmetrical manner, these different pressures being applied along the full length or essentially the full length of the cylindrical body. The total length of the transparent body can, for example, be less than 6 cm for the applications envisaged herein, but may also be longer.

To eliminate, in particular, the influence of thermal stresses on the birefringence it can be advantageous if the transparent body is, for example, unstructured, in particular internally (no internal holes and the like), in a region where a separating wall between pressure chambers and/or where a housing is attached or in contact with the transparent body.

For the sake of completeness it is pointed out that it is also possible to have a transparent body including (e.g., consisting of) two (structured) halves which are spatially separated.

A further exemplary embodiment of the present disclosure includes a transparent body as a cylindrical body with two parts of equal length. In this case, the two parts can, for example, include an essentially identical internal structure leading to an asymmetric stress distribution in the body, in turn giving rise to the desired pressure dependent birefringence effects. This internal structure providing this asymmetric stress distribution can for example be given in the form of longitudinal (e.g., cylindrical) holes or openings, leading to an asymmetric stress distribution in the body. In any case, the two parts can be rotated by 90° about the principal axis of the cylindrical body relative to each other, so that the stress distribution in the two parts cancel in as far as the birefringence induced thereby is concerned. This can be achieved in that in each part the internal structure can be given as a pair of longitudinal holes, the axes of which are equally distanced from the principal axis of the cylindrical body and the axes of which are oriented in one same plane including the principal axis of the cylindrical body. So in this configuration, in one part the two longitudinal holes are for example arranged in a horizontal plane including the central principal axis of the cylindrical body, and in the other part the two longitudinal holes are arranged in a vertical plane including the central principal axis of the cylindrical body. In order to provide the necessary symmetry, the holes in the two parts have the same diameter and are arranged equally distanced from the central principal axis of the cylindrical body.

According to an exemplary embodiment of this configuration, the diameter d of the cylindrical hole can be between ⅛ and ⅓, for example in a range of ¼ of the diameter D of the cylindrical transparent body, thus leading to a good compromise between pressure induced stress and resistance to overpressure. The transparent body can have terminal surfaces perpendicular to the principal axis at least in the regions where the light beam is coupled into the transparent body. The two parts are, for example, arranged adjacent to each other in a butt joint, but it is also possible to have a distance between both parts. This distance may be filled with glass (e.g. same material as the cylindrical body) or just kept void. An exemplary advantage is that stresses exerted from the outer casing on such a glass body can be less critical, if this body is unstructured in the respective region.

In a further exemplary embodiment, the parallel or minimally divergent light beam travels along the central longitudinal axis of the transparent cylindrical body with terminal planes oriented perpendicular to the central longitudinal axis of the cylindrical body.

The transparent body can, for example, be irradiated along the central longitudinal axis from one side with a light beam and the transmitted light leaving the transparent body is detected using, for example, two detectors on the other side. It is on the other hand also possible to allow the light beam to travel through the transparent body several times e.g. by using mirrors for increasing the differential effect, however, calibration can become more difficult and care should be taken that the needed symmetry for cancellation of interferences can be maintained for multiple light paths through the transparent body. The detectors can measure the total integrated intensity within a certain spectral range, but it is also possible to measure only the intensity within a very narrow spectral window or actually measure the spectrum itself. The detectors can be detector diodes which can be electrically or electronically connected in some way, e.g. using a Wheatstone Bridge, such that a difference signal is output and is used for further evaluation of the differential signal.

For easy measurement of the birefringence properties induced by the applied pressure the light beam irradiated into the transparent body can be linearly polarised. However, it should be noted, that for example circularly polarised or elliptically polarised light can be used as well. The polarization can be produced by using a polarisation filter, but it is also possible to use a polarised light source, like e.g. a semiconductor laser. The light beam leaving the transparent body can split into its two polarisation components using a polarising beam splitter with the same orientation as the linear polarisation filter for detection by the two detectors. A linear polarisation filter can be included between the light source and the transparent body oriented at, for example, 45° and to have a polarising beam splitter at the other side of the transparent body also oriented at ±45° between the transparent body and the detectors. Since in such a setup the pressure dependence or the differential signal measured is essentially given by a cosine of the pressure difference, the sign of the pressure difference is not unambiguous. Therefore, according to another exemplary embodiment of the present disclosure, it is proposed to arrange an additional phase shift element, such as a quarter wave plate, in the light path. This can be aranged, for example, between the polarising filter and the transparent body or between the transparent body and the polarising beam splitter. So, in accordance with a further exemplary embodiment of the present disclosure, behind the transparent body, the light beam can be passed through an optical phase shift element, such as through a quarter wave plate.

According to a further embodiment of the pressure sensor of the present disclosure, the two different pressures for the measurement of the differential pressure can be applied to the cylindrical transparent body by means of two identical, longitudinally spaced circumferential pressure chambers, which are, for example, filled with a liquid, such as with silicone oil.

The transparent body can be a glass body made, for example, of fused silica.

In a further exemplary embodiment of the present disclosure, it is proposed to arrange the transparent body in an outer casing, the pressure chambers being given by the inter-space between the outer surface of the transparent body and the inner surface of the outer casing. This can allow a high over pressure resistance of the setup. The outer casing can be a cylindrical tube in which the cylindrical transparent body is mounted coaxially, and wherein the two pressure chambers are separated by a separating wall which is arranged at the plane separating the two parts of the cylindrical transparent body, and wherein in the region of the terminal surfaces of the cylindrical body terminal walls are provided for separating the pressure chambers. Either in these terminal walls or in the cylindrical wall of the casing, each pressure chamber can have a corresponding sensing opening for communication with the actual pressure sensing region or unit. In case of circumferentially distributed pressure chambers (embodiment in accordance with FIG. 5) also a cylindrical outer casing is possible, and in this case the separating walls can be oriented radially and given by or arranged in two planes which both include the central longitudinal axis of the transparent body and which are tilted with respect to each other by 90°.

According to a further exemplary embodiment the outer casing can be made of steel. The steel can be selected to have an essentially equal or at least similar temperature expansion characteristic as the transparent body, and preferably the transparent body is fixed within the casing by hard soldering. Alternatively, a flexible O-ring can be used to allow thermal expansion differences between casing and glass body without large critical stresses on the glass body that may affect the measurement. In order to have a high overpressure resistance, the pressure chambers can include rounded edges.

According to another exemplary embodiment of the present disclosure, the light beam is provided by a light source, such as by a light emitting diode, which is, for example, modulated in intensity for increased measurement sensitivity. Prior to transmission through the transparent body, the light beam can be passed through a polarisation filter.

In order to further reduce the influence of, e.g. temperature, on the measurement it can be advantageous that additionally a temperature measurement sensor and/or a light intensity sensor for measuring the intensity of the light source are provided, and that the data from these sensors are incorporated in the evaluation of the differential pressure.

The present disclosure furthermore relates to a method for detecting a pressure using, for example, a pressure sensor as described above. The method can use a pressure sensor with at least one optical sensing element, the pressure induced changes in the birefringent properties of which are read out by transmission of at least one light beam. In this method, the pressure sensor can comprise at least one (e.g., only one) single-material transparent body which is subjected to at least two different pressures in at least two different regions via at least two pressure chambers, wherein the transparent body is transmitted by a parallel or minimally divergent light beam without total reflection in the body such that the birefringence of a transmitted light beam depends on the difference of the different pressures, and wherein the differential pressure in the two pressure chambers is evaluated based on the differential output of these detectors, based on the sum or difference output of these detectors, based on the ratio of the output of these detectors, or based on a combination thereof.

In the present description, the concept of "birefringence effect in structured glass bodies" is examined in detail. Birefringence in a material causes two orthogonal polarizations of light to propagate with different phase velocities, due to different refractive indices. The effect of birefringence is observed when uni-directional stress or pressure acts on an isotropic material. In the present case, a glass body can be structured such that it very efficiently transforms pressure into an uniaxial stress.

In order to evaluate whether this principle is suitable for pressure sensing in an industrial environment, an explicit, exemplary sensor setup has been designed and its performance has been verified. A model of the sensor physics is described in detail. The proposed sensor uses pressure-induced birefringence of a structured glass body.

Figure 2A:
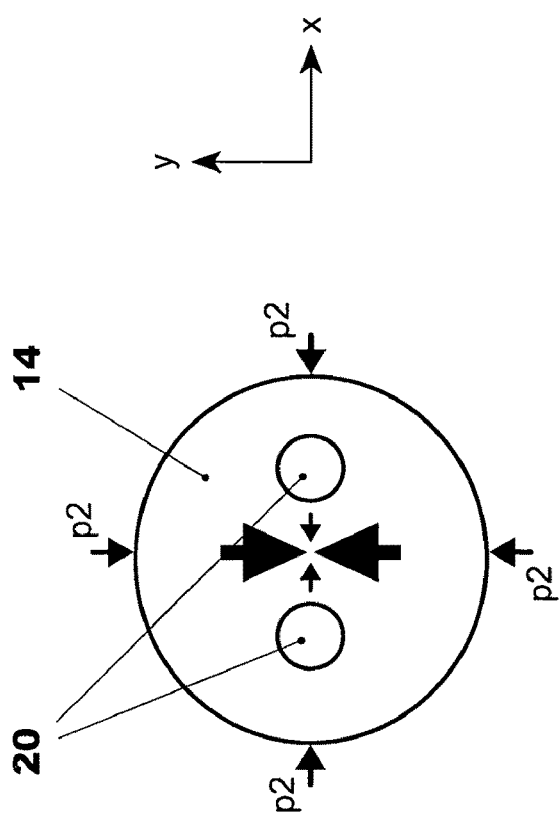
FIG. 2 shows in a) an exemplary inhomogeneous stress state: pressure leads to a constant normal force (per area) onto the surface; the holes shield the center from the horizontal pressure; the stress state (simplified) at the center is indicated by the arrows; a sketch of exemplary light amplitude (b) before and (c) after transmission through a rod with inhomogeneous pressure distribution.
Figure 2C:
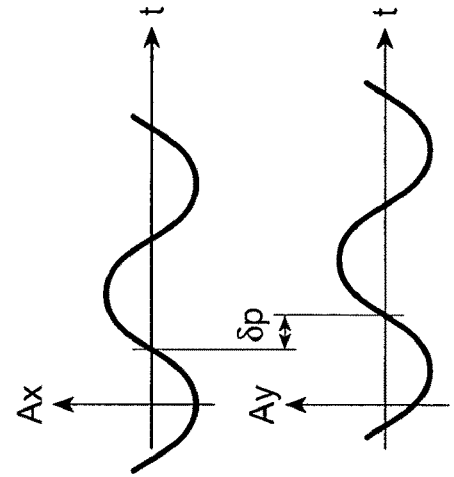
Figure 2B:
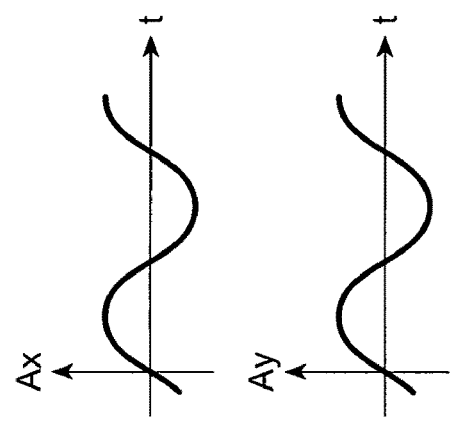

An exemplary embodiment of a glass sensor is shown in FIG. 1. The sensor 18 is made from a cylindrical structure 10 including (e.g., consisting of) two identical glass rods 11 and 12 which are coaxially fused together and rotated by 90° with respect to each other. The inner part of the glass rod is structured with holes 19, 20 such that it can very efficiently transform pressure into an inhomogeneous stress state in the center of the rod (FIG. 2 a)). This inhomogeneous stress state leads to birefringence, that can be measured, of the light propagating at the centre of the rod. An orthogonal coordinate system is used, wherein z denotes the beam propagation direction and x and y denote the transverse directions, i.e. the light polarization is oscillating in the xy-plane and, in particular, linear polarization components x and y are oscillating along the x- and y-axis.

The birefringence is caused as follows: due to stress, the velocity of light in the material is slightly altered. Different stress in the x- and y-direction (FIG. 2) leads to different velocities for light polarized in these directions. Therefore, light being initially in phase (FIG. 2 b)) is out of phase after transmission (FIG. 2 c)) through the rod. The phase shift $\delta_p$ is related to the transmission time depending on the velocities.

The phase shift $\delta_p$ is given by $$\delta_p = \frac{2\pi}{\lambda} K \int_0^L dx(\sigma_x - \sigma_y),$$

wherein $\lambda$, K, L, $\sigma_x$, $\sigma_y$ are the wavelength of the light, the stress-optical constant, the length of the rod and the stress in the respective (transverse) directions x and y, respectively. The phase-shift $\delta_p$ can be measured using crossed polarization filters before and after the glass body.

For differential pressure measurement, there are two pressure chambers 8 and 9 that are separated by a seal 7 such that the two rods 11, 12 with cross sections rotated by 90° see pressure p1 and p2, respectively. Light 2 of a light source 1 (e.g. an LED) is linearly polarized (polarization direction 45° within the xy-plane) by a polarisation filter leading to a polarised parallel or minimally divergent light beam 21 which is fed into the glass body 10. At the other end the output light 22 is split into two orthogonal polarizations by a polarizing beam splitter (PBS) 16 oriented at 45°, and is led onto detectors 17 and 17', respectively. The detectors deliver intensity signals $I_1$ and $I_2$. The final signal can be calculated as $$S=(I_1-I_2)/(I_1+I_2)\sim\sin(c\delta p)$$

where $\delta_p$ is the pressure difference and c is a constant depending on details of the setup.

The concept uses the fact that pressure induces a differential phase shift ($\delta_p$) between the two orthogonal polarizations, which phase shift is proportional to the applied pressure in each glass rod. For p1=p2, the mutual phase shifts $\delta_{p1}$ and $\delta_{p2}$ caused by the glass rods cancel, since $\delta_{p1}=-_{p2}$, because the glass rods 11, 12 are rotated by)90°. For p1≠p2, a non-vanishing phase shift proportional to the pressure difference remains and leads to a non-vanishing signal at the detector, which is a measure for the pressure difference.

Sensor model: For the physics of the sensor, modelling of the glass body and the birefringence is important. According to the above equation the phase shift due to the birefringence is determined by the stress state integrated along the light path. We have used two- and three-dimensional finite element models to calculate stress states within the glass body. Standard linear elasticity theory has been used. Applied pressures are incorporated via boundary conditions. Maximal tensions have been calculated to estimate the maximal applicable overpressure.

Figure 3:
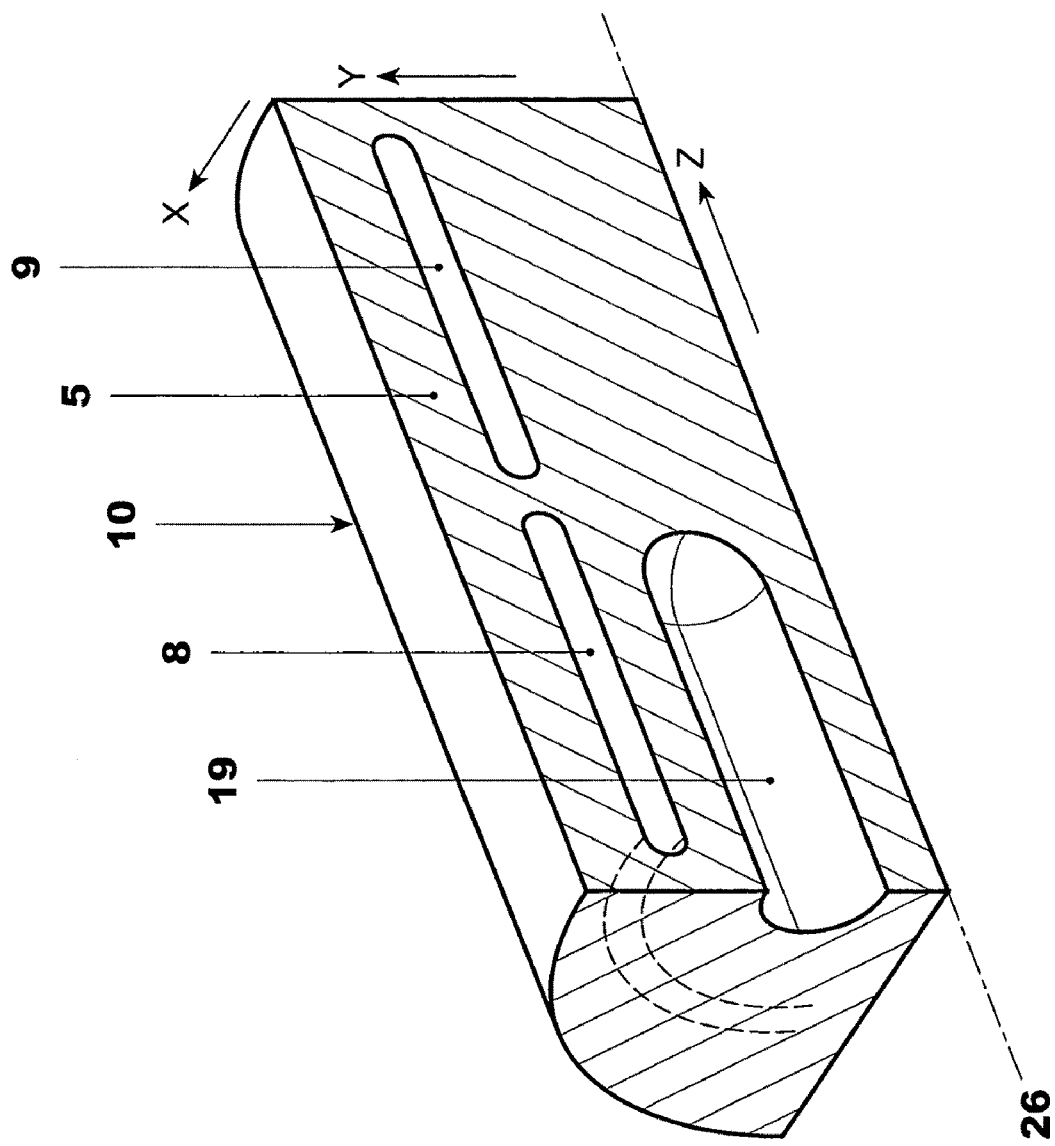
FIG. 3 shows an exemplary investigated sensor setup with dimensions [m] indicated on the axis, wherein only a quarter of the total system is drawn; on the left, near the lower axis, a hole of the structuring can be seen; above there are two slits corresponding to pressurized chambers; the inner part (up to the lower radius of the slits) is made of fused silica, the outer part is made of steel.

The stress state is linear in the applied pressure, i.e. solutions for arbitrary applied pressures can be found by superposition of (two) basic solutions. Because of the structuring of the glass body, the solution has certain symmetry properties due to which the phase shift due to birefringence has a saddle point at the symmetry axis, which is the intended travelling region for the light path. The exemplary investigated sensor setup with approximate dimensions [m] indicated on the axis is given in FIG. 3. Only a quarter of the total system is drawn. On the left, near the lower axis, a hole of the structuring can be seen. Above there are two slits corresponding to the pressurized chambers. The inner part (up to the lower radius of the slits) is made of fused silica, the outer part consists of steel.

Exemplary System Specification and Evaluation

Birefringence sensing element: The exemplary investigated pressure sensor is made of a glass block 10 of fused Silica joint together with an outer casing 5 made of steel. The two parts are joint e.g. by hard soldering. A sketch of the device is shown in FIG. 1; a more detailed drawing of the system with the definition of the parameters describing the dimensions is given in FIG. 4.

This setup has been chosen in order to fulfil the following exemplary requirements:

1. Sensitivity to pressure: Size, position and length of the holes within the glass body determine the magnitude of the measurement effect. Large diameter or small distance between the holes lead to larger stresses at the center of the device and hence a larger sensitivity to pressure. On the other hand, if stresses are too large, the system is not stable with respect to overpressure. Furthermore, geometric asymmetries can, for example, become more important. The position and size of the holes in our case have thus been mainly chosen in order to allow an accurate and symmetrical production. The sensitivity is then mainly determined by the length of the sensor. We have chosen a total length of approximately 5.8 cm that proves to be reasonable for the size of a pressure sensing element. If high sensitivities are desired (e.g. for smaller pressure ranges), instead of increasing the size of the system, one may use mirrors to e.g. double the light path. In our design, the total phase shift is assumed to be in the region between $\pm\pi/2$ in order to, for example, guarantee an non-ambiguous relation between phase shift and applied pressure. In principle, one might go to the opposite extreme having phase shifts that are (large) multiples of $\pi/2$ and count the number of zero transitions induced by changing differential pressure (fringe counting). Apart from the larger complexity, such a device would need more space compared to the exemplary setup suggested here.
2. Stability and overpressure protection: The system can be intrinsically overpressure safe. Unfortunately, glass (i.e. fused silica) is unstable with respect to relatively small tensions (8 MPa) at surfaces. Compression is uncritical. Therefore, pressure chambers should not be included in the glass body, as the application of pressure can lead to tensions. For this reason, it can be advisable to use an outer casing 5 made of steel. The use of a second material is principally unfortunate as temperature changes in material compounds lead to thermal tensions. Instead of a rigid connection by hard soldering a more flexible joint with an O-ring can be desired and possible. Non-symmetrical tensions can lead to errors in the pressure measurement. In our case, the steel casing is, for example, only connected to the glass body at its middle position and its end position. In order not to generate unwanted large stress spikes, we suggest to round off all edges in the structure, especially at the inner end of the holes.
3. Symmetry: The measurement effect can be based on the non-symmetry of the stress distribution at the center of the glass body due to the holes. It is clear that the system has to be built as symmetrical as possible in order to exclude other effects that could lead to inhomogeneous stresses. Therefore, cylindrical shapes for the glass body and the holes have been chosen. In principle, the sensor might be divided into two separate parts in the middle position with some spacing in between, such that stresses on one side do not induce stresses on the other side. Then even the two parts might be spatially apart. However, such solutions can pose problems as a very symmetric alignment of the two parts can be desired. Therefore, a single piece of glass can be used wherein the alignment is fixed and does not change due to environmental conditions.
4. Easy production: The system should to be easily producible. We have chosen appropriate dimensions for this purpose. Round shapes and circular holes are also advantageous.

Here we only want to mention one principal alternative that is of similar interest as the solutions discussed so far. This exemplary setup is sketched in FIG. 5: The sensor includes (e.g., consists of) a single part with pressure chambers 8, 9 arranged along the cylindrical glass block 10. No holes are present within the block. A glass body 10 with given and steel walls 25 of the pressure chambers 8, 9. The outer walls of the pressure chambers are not drawn. The ability to convert (differential) pressure into an inhomogeneous stress difference can be characterized by a dimensionless enhancement factor given by the ratio of (differential) pressure and stress difference. This enhancement factor is of the order of unity for this alternative setup (similarly to our device with side-holes). Instead of symmetry between the two halves in the side-hole device, the symmetry of the pressure chambers along the structure can be decisive. An exemplary advantage of this design is that the difference in stress between z- and y-direction can be rather constant near the center and thus the alignment of the light beam is not as important as in the current design.

Table 1 lists the experimental values which are also used for the model calculations:

TABLE 1

Dimensions and physical parameters defining the specific sensor investigated.

| Dimensions | | |
|---|---|---|
| overall length | L | 0.058 m |
| diameter of glass body | D | 0.03 m |
| Length of holes | $d_1$ | 0.025 m |
| distance between holes | $2 d_2$ | 0.008 m |
| diameter of holes | d | D/4 |
| distance center - center of holes | b | D/4 |
| width of pressure chambers | h | 0.0025 m |
| thickness of steel casing | t | 0.005 m |
| Optical parameters | | |
| wavelength | λ | 572 nm |
| stress optical constant | K | $3.4\ 10^{-12}$ 1/Pa |
| Mechanical parameters | | |
| Young modulus of elasticity (fused | E | 73.1 GPa |
| Poisson number (fused Silica) | ν | 0.17 |

Figure 4A:
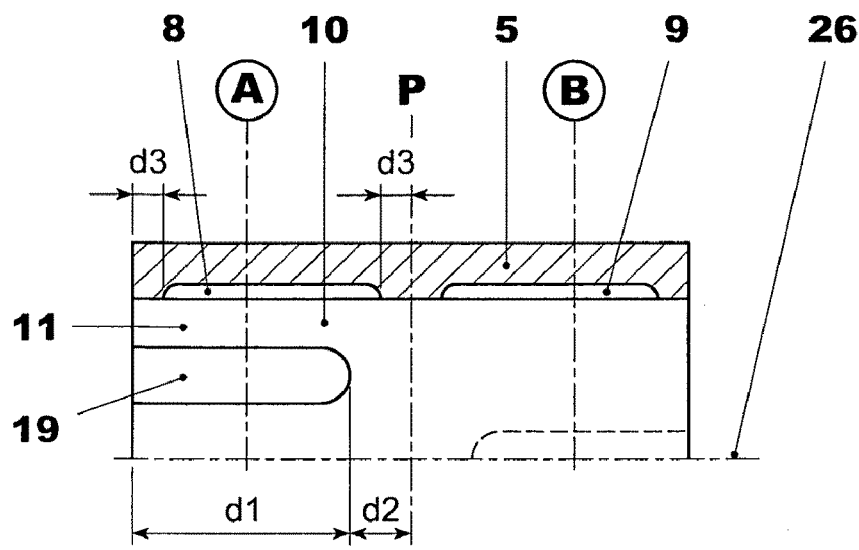
FIG. 4 shows the exemplary investigated setup with definition of the dimensions used.
Figure 4B:
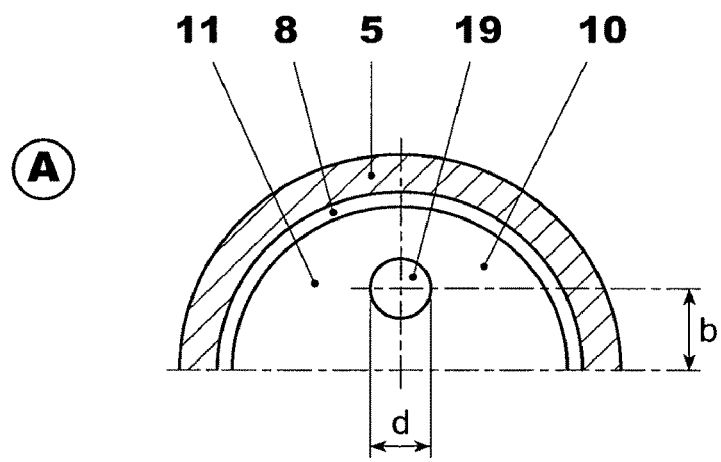
Figure 4C:
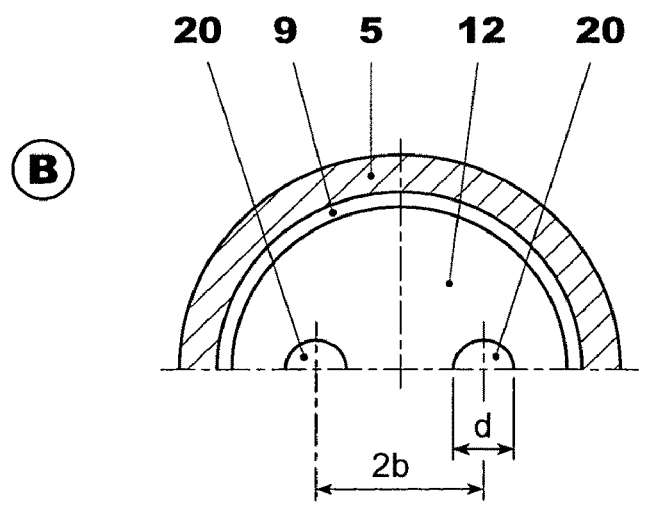

FIG. 4 gives an exemplary definition of the dimensions of a selected design; in Table 1 the actual parameters also used in the calculation are specified. As the outer steel casing is not used in the explicit calculations, the values given are rough estimates only.

Illumination and detection: For the illumination of the system a standard light emitting diode 1 (LED) can be used. Alternative light sources with smaller spectral width (Lasers, superluminescent diodes etc) are possible. The use of LED light is possible as in an exemplary case only phase shifts smaller than π It are considered. Any standard LED can be chosen for that purpose. We have chosen an LED from Osram Semiconductors, LG series with a peak wavelength of 572 nm and a spectral width (full width at half maximum) of 30 nm.

The detector circuit includes (e.g., consists of) two photodiodes and a differential amplifier. A Wheatstone bridge setup can be used for the detection circuit together with a transimpedance amplifier.

In order to reduce power consumption of the LED and to achieve optimal signal sensitivity, the LED can be modulated by an oscillator circuit. We have chosen an oscillation frequency of 10 kHz and a duty cycle of 1:10.

Exemplary Performance Estimates

Pressure range: A pressure sensor can be characterized by the upper range differential pressure limit. This limit determines that pressure range within which the sensor operates with the desired accuracy. For the specified sensor, we have evaluated which upper range pressure limits can be chosen so that the sensor fulfils a desired accuracy (see FIG. 7). The analysis shows that the upper range pressure limit can, for example, be chosen between 0.68 bar and 10.2 bar. The determined pressure range for a given device depends on the signal to noise ratio of the detector and the sensitivity of the phase shift to differential pressure. A longer (shorter) device has a higher (lower) pressure sensitivity and can be used for detection of smaller (larger) pressures.

Another exemplary important criterion for a pressure sensing element is its protection with respect to overpressure. For the specified sensor, we find an upper pressure limit of 250 bar for static pressure and 92 bar for differential pressure, respectively. These numbers are conservative estimates and have some uncertainty or error. The limits are caused by tensions in the glass body near edges and boundaries, Errors: Two types of errors can be important for the suggested setup: errors due to environmental influences and errors due to a lack of symmetry of the device. The main influence from outside is given by temperature. Due to temperature, the peak wavelength and spectral width of the LED change. As the measured effect depends on the wavelength (see equation above), a direct change in the sensitivity is observed which can be approximately 0.19% for a temperature change of 10K. However, as the stress optical coefficient K also depends on wavelength, there can be a further change in opposite direction by approximately −0.05%. The stress optical coefficient itself can depend on temperature by an amount of 0.13%. Taking these effects together, we have a change in sensitivity of around 0.3% per 10 K. In order to achieve the desired small errors and, in particular, a temperature hysteresis smaller than, for example, 0.03%, it is appropriate to correct this error. However, this can be easily done, if temperature and/or intensity of light is or are additionally measured.

Temperature may also lead to thermal stresses, as different materials (fused silica and steel) are used. It can be important to choose a steel with rather similar temperature expansion coefficient as the glass in order to keep stresses small. However, for the "ideal" symmetrical device, thermal stresses can lead to symmetric stress distributions that do not contribute to the measurement effect. Hence it can be decisive to construct and produce the device as symmetrical as possible.

This can be seen from the estimates of errors due to non-symmetries. We have roughly analysed a few representative cases of changes in the glass geometry or in the light path. Lack of symmetry can lead to two effects: (i) a change of sensitivity with respect to differential pressure (relatively uncritical), (ii) an offset of the signal that depends on the static pressure. This signal dependence on static pressure can be serious, as it cannot easily be corrected.

A different length of the two pressure sides (length difference 0.1 mm) can thus lead to an offset of 1.8% of the upper range differential pressure limit at a static pressure of 10 bar. The offset can be proportional to the applied static pressure. A change of the hole diameter is even worse: 1% change for a single hole (out of the four holes) gives an offset of 10% at 10 bar static pressure. Errors due to asymmetries of the light beam are of similar magnitude.

Thus, errors due to symmetry should, for example, be avoided by the use of an accurate and symmetrical device. Glass can be treated with high precision (e.g. for optical systems) and the symmetry of a given glass body or device can easily be tested.

Detailed Information

Properties of glass (fused silica): Fused silica as material for the transparent body can have several advantages: it is cheap, easy to handle and has in principle good inertness against chemical and physical outer influences.

Glass as material is rather brittle and is unstable with respect to tension at the surfaces. Tensions lead to a growth of small cracks and finally in breaking of the whole structure. The tensile strength of fused silica is 48.3 MPa, but due to the crack propagation the actual strength of a glass depends strongly on its dimensions and surface properties (e.g. roughness). Schott recommends to limit the tensile stress to 8 MPa for optical glass; otherwise detailed stress calculations and estimations of risk and lifetime should be done.

In an exemplary system disclosed herein, if the structure is loaded with pressure from the outside, no tension but only compression of the glass body occurs (i.e. the principle stresses all have the same, negative sign). In this case, tensile strength and breaking of the glass is not problematic. However, at the boundaries between both pressure chambers tensile stresses can occur that ought to be controlled. The maximal compressive stress is cited to be larger than 1.1 GPa. Above 3 GPa, reordering of the atomic structure in the glass begins and the glass densifies. It is not clear whether similar to the tensional stress some safety factor has to be used so that no plastic deformation can occur at all. Using the same safety factor as for tensile stress, we find a maximal stress of 140 MPa corresponding to 1400 bar.

In measurements with silica optical fibres, instabilities of the material at high pressure and temperatures have been reported. OH-groups from water (or similar substances) are diffusing into the glass. Especially, this can lead to tensions that—in the case of the fibre—changes the tensions used for measuring the pressure. Therefore, for a long term operation of optic fibre sensors either the glass body should be coated to prevent such processes or a pressure medium has to be used that is non-aggressive for the silica. It has further been demonstrated that the use of Silicone oil that has been preprocessed to remove any traces of moisture is sufficient to prevent the aging effect. Hence with a proper selection of the used oil in the chambers 8, 9 the diffusion effect is not relevant for the macroscopic glass body used in our device.

Theory of stress induced birefringence: Birefringence is a consequence of anisotropy of the dielectric tensor. Due to the symmetry properties of this tensor, it can be diagonalised in general and three constants for three perpendicular directions characterize the dielectric behaviour. If these constants are not equal [i.e. for uniaxial (two different values) or biaxial (three different values)], the propagation of electric waves can show certain peculiarities: for the same propagation direction different waves with different linear polarization exist. Due to the different dielectric constants, they propagate at different velocities.

Important for the present setup can be dependence of the signal intensity I on the phase shift δ, which can be shown to be given by:

$$I = (\vec{\alpha}')^* \cdot \vec{\alpha}'$$
$$= \cos^2(2\beta)\sin^2(\delta/2).$$

Wherein the vector a' is the final light vector and β is the angle between the "fast" principal axis of the stress and the x-axis. As expected, the signal vanishes for a zero phase shift δ=0, and it is maximal for δ=π.

Two and three-dimensional calculations have been performed; in two dimensions, we assume that a plane strain approximation can be used. For long bodies with a constant cross section (along the 3-axis), the strains in this direction can be set to zero, thus simplifying the calculation due to the lower dimension. For monochromatic light, a first estimate of the magnitude of the effect is as follows:

We have considered three different exemplary cases of glass body cross sections and distribution of the pressure. The following assumptions for the desired material constants are made:
  wavelength of light: 550 nm
  length of glass body 0.2 m
  pressure $10^5$ Pa
  constant K 2.0 $10^{-12}$/Pa.

It is easy to convert the results to other pressures, sample lengths etc.

In a simplest case discussed here, the pressure is applied on the outside of the body which is structured with two holes. The pressure in the holes is assumed to be zero. The situation is sketched in FIG. 6b together with the calculated stress distribution. The largest stresses occur near the boundaries of the holes in the structure; at the centre of the body there is also an inhomogeneous stress distribution due to the horizontal alignment of the holes: we have stresses of −0.52 Pa in xx ($\sigma_{xx}$=−0.52 Pa), −2.65 Pa in yy ($\sigma_{yy}$=−2.65 Pa), zero in xy ($\sigma_{xy}$=0 Pa), and −0.54 in zz direction ($\sigma_{zz}$=−0.54 Pa) at this point.

Figure 6:
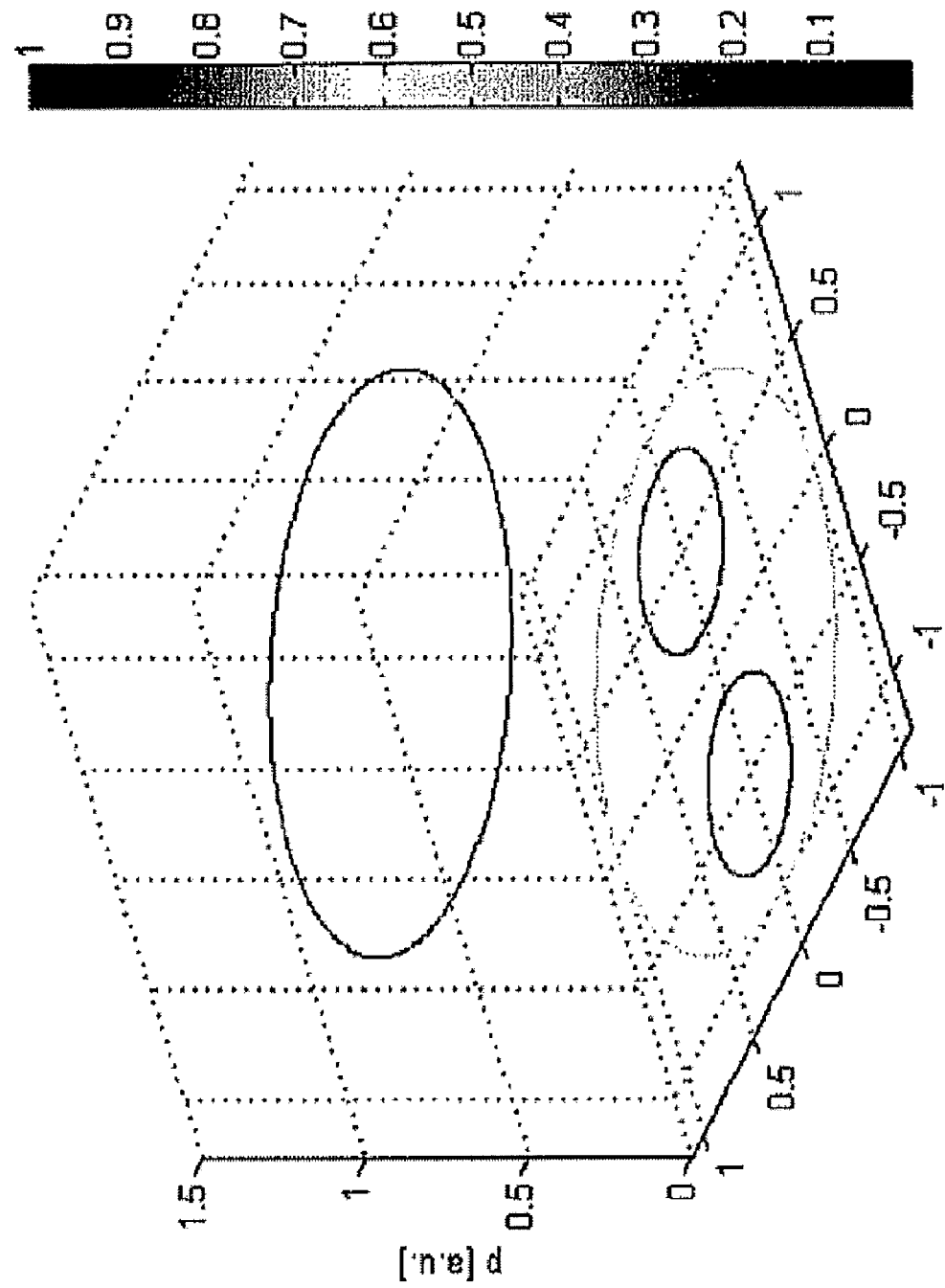
FIG. 6 shows in (a) an exemplary configuration in a sketch of a cross section and applied pressure at the boundaries, (b) components of exemplary calculated stress tensor; x and y are the horizontal and vertical axis in the Figure, z is the longitudinal axis of the glass body, (c) shows an exemplary resulting relative intensity of parallel light propagating through the glass body.
Figure 6B:
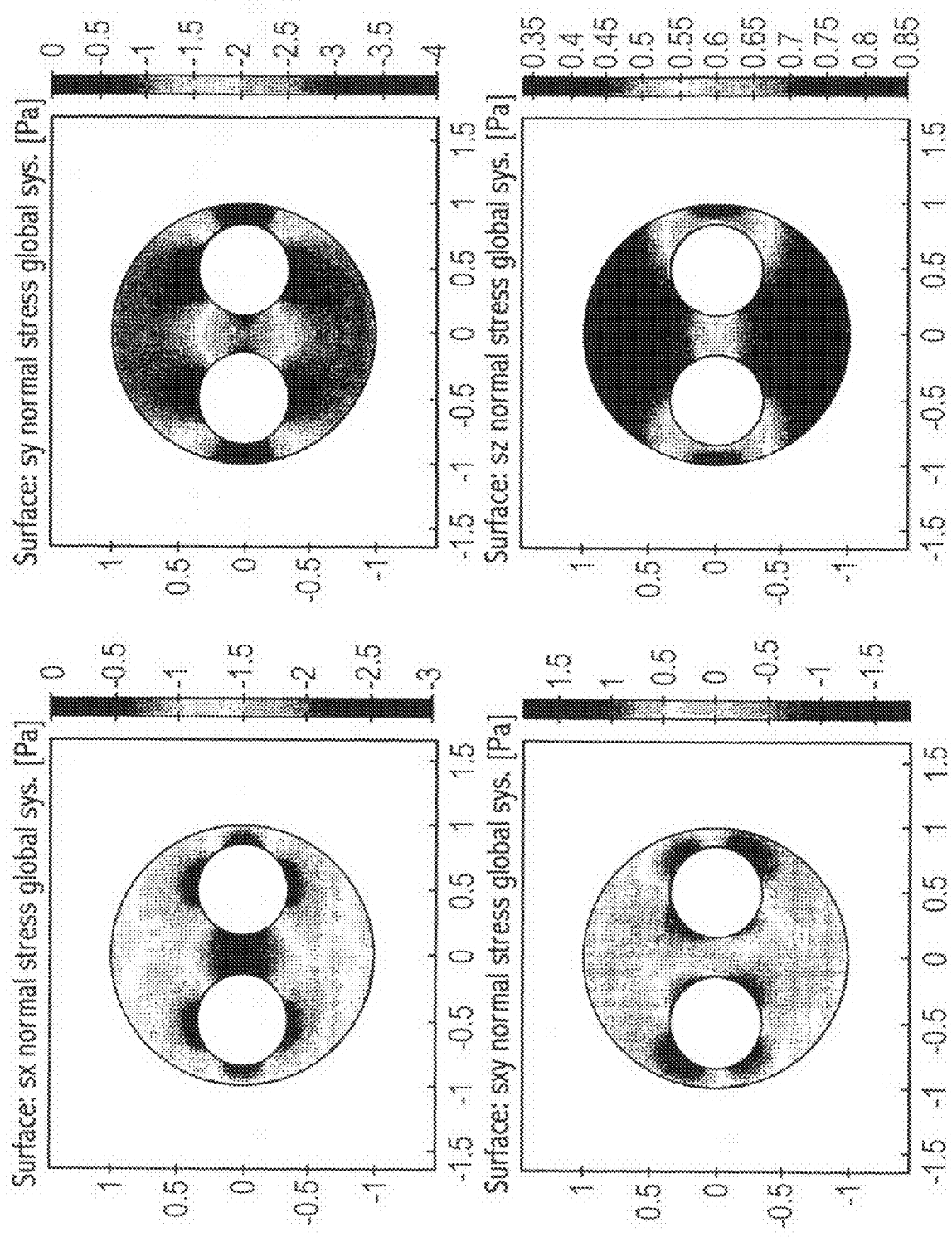
Figure 6C:
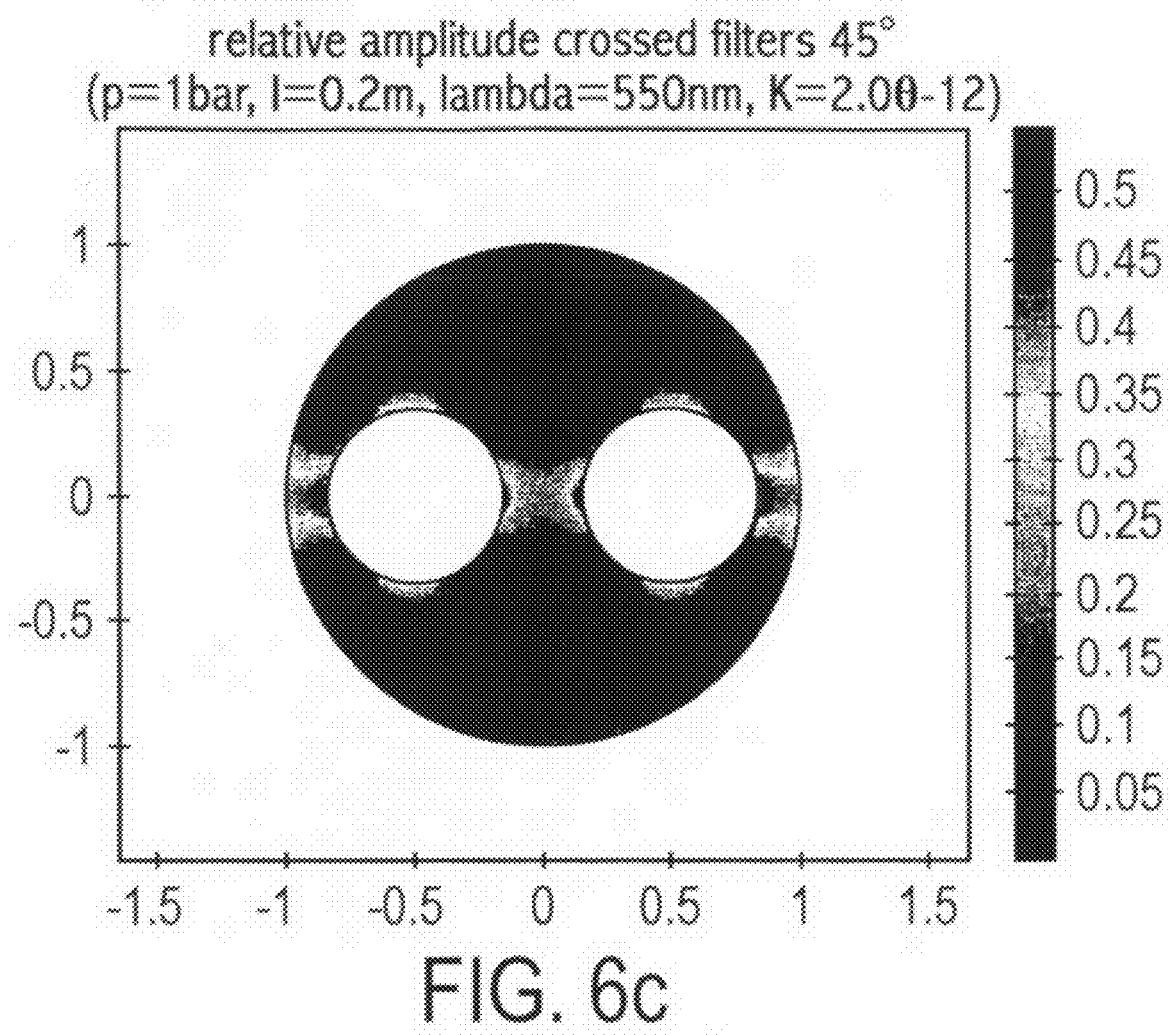

From the data the intensity of a light beam propagating through the glass body along the z direction can be calculated. We assume that the beam is prepared and filtered as described above. The intensity as a function of chosen xy coordinates is shown in FIG. 6 c). At the points with large inhomogeneous stresses, the signal is changed markedly (note that a zero signal is expected when no pressure is applied). In the middle, we have a signal of around 20% of the maximal possible light amplitude. Changes in this order of magnitude can easily be measured by optical detectors. For a differential pressure sensor, one would combine sections with pressure p1 applied from the outside and sections with pressure p2 applied from the outside.

An exemplary experimental setup of the proposed sensor is shown in FIG. 1. Light of an LED 1 is used for monitoring the pressure-induced phase shift.

Before entering the device the LED light is polarized by means of a polarisation filter 3 oriented at 45° such that two orthogonal linear polarization modes are fed into the glass body 10 which modes are oscillating in x- and y-direction, respectively. Particular attention shall be paid to ensure that the beam direction is parallel to the axis of the glass rod. The light of the LED should only propagate in the region between the air holes near the axis of the device, i.e. the LED beam divergence should be smaller than φ<arctan((2β−d)/L). This condition defines low-divergent beams for the system in consideration. For sources with larger beam divergence or for sensors of larger length a collimation of the LED light beam with an additional lens is advisable.

The light 22 emerging out of the end face 27 of the sensor carries the wanted signal, i.e. the accumulated phase shift between the two polarization modes. In the general case the outcoming light 22 can be characterized by the phase between the different main directions. A λ/4 plate can be used to add an additional phase shift of π/2 between the two polarization directions. This allows to detect the sign of the applied differential pressure: the total signal is proportional to the sine of the pressure and not the cosine. A succeeding polarizing beam splitter 16 splits the light into the two modes 23 and 24 oriented at 45° to the x- and y-axis (i.e. ±45° to the x-axis) and directs them onto separate detectors 17, 17'. The differential pressure can be measured by taking the difference of the two signals at detector 17 and 17', and this difference can be furthermore divided by the sum, in order to compensate for fluctuations of the optical output of the LED or varying light losses occurring in the light path.

Details of illumination and light detection (e.g. choice of components): The light source can be a standard LED. It can be chosen mainly according to its beam profile: a rather small beam divergence is necessary as discussed above. The wavelength of the LED is not important for our application and can be chosen freely. A small spectral width and a small temperature coefficient can be favorable. For the setup, we have chosen an LED from the Osram LG series with a peak wavelength of 572 nm.

To reduce the power consumption of the LED and to achieve optimum signal detection, the LED can be modulated by an oscillator circuit. An oscillation frequency of 10 kHz with a duty cycle of 1:10 (operation current: 10 mA at 3V) can be used. This leads to an average power of 3 mW. This is in accordance with the use of a two wire 4-20 mA power supply for the device as desired.

A setup of the detector circuit includes a Wheatstone bridge configuration for the photodiodes which allows an exact measurement of the difference of the light intensities. Thus, a signal-to-noise ratio of 1.2 $10^5$ can be achieved. We use photodiodes Hamamatsu S6865-02 and an amplifier BurrBrown OPA124. Further parameters are: modulation frequency LED 10 kHz, measurement bandwidth 1 kHz, photocurrent 10 μA, feedback resistor 5 kΩ.

Design considerations: A current exemplary setup and its dimensions are sketched in FIG. 2 and FIG. 3. This geometry has been chosen for the following reasons:

i) Overpressure protection: As outlined above, pressurized holes in the glass body can be important for breakup of the sensor. Therefore, the holes used for vertical and/or horizontal structuring of the glass body are connected to ambient pressure. Pressure in the pressure chambers will lead to compression of the glass body only, not to tensions. Tensions occur solely in the steel part.

ii) Magnitude of measurement effect: Choosing the size of the holes and their distance to the center of the glass body, one can change the sensitivity of the system to pressure: The tensions at the center can be connected to the applied pressure by an enhancement factor that depends on the geometry. It can be dangerous to choose this factor too large: in this case large tensions can appear and small inaccuracies in the geometry might lead to large errors. We have chosen exemplary dimensions that can lead to an enhancement factor of 2-3 for the infinitely long tube; the effective factors for the real device are smaller due to the transition between the different regions (see below).

iii) Overall dimensions: Considering the infinite cylindrical section of a sensor, the system can be scaled in transverse dimensions and any outer radius can be chosen. For the real device, this scaling is not true because the ratio of length to width is of order unity and plays a role for the measurement effect (enhancement factor is reduced). We have chosen dimensions that can be realized. Smaller dimensions would involve producing a very parallel or minimally divergent light beam, which can be difficult to achieve, or would involve a fiber core which would bring in an additional material and corresponding thermal tension problems.

iv) Symmetry and thermal tensions: In exemplary embodiments, the setup should be as symmetric as possible. Therefore a cylindrical body with cylindrical holes can be favorable. In particular, edges shall be avoided. The outer casing made of steel is only bonded to the body near the edges and at the middle so that thermal tensions can couple in only in a symmetrical manner. The non-symmetric part of thermal tensions should be kept as low as possible.

v) Changes with pressure range: The current exemplary design is in principle easily adapted to other pressure range, because it is sufficient to change the length of the pressure chambers. However, for small pressure ranges this might lead to too clumsy designs and some alternatives, such light paths including reflections at mirrors, are proposed. We have chosen a length that is suitable for the size of known pressure sensors, and the corresponding pressure ranges for this configuration have been calculated.

Figure 5:
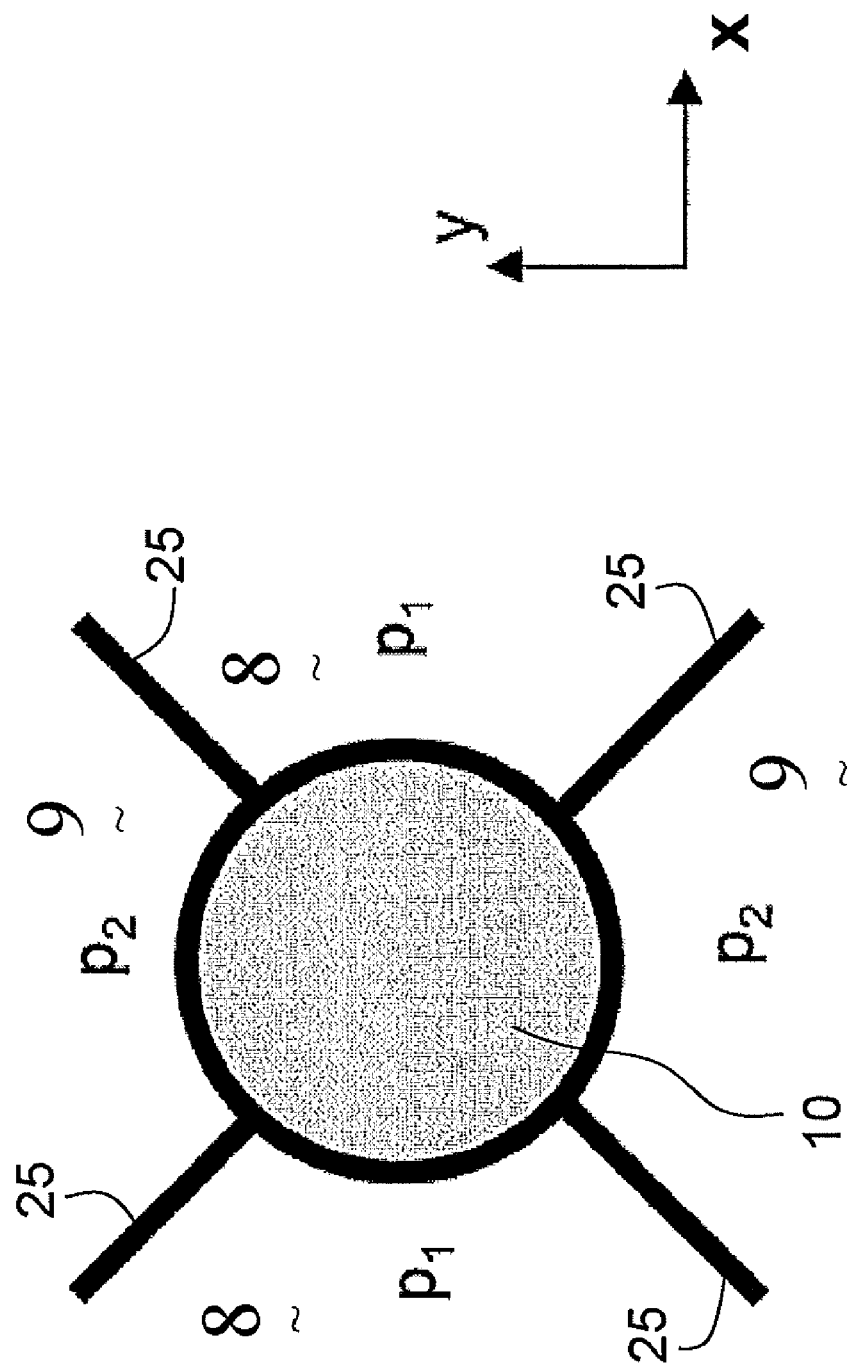
FIG. 5 shows an alternative exemplary setup in a schematic cross section.

We discuss several alternative exemplary designs and ideas and their respective advantages and disadvantages:

i) Different shape of the holes: Instead of circular holes, one might use holes with other shapes. However, bow-tie shaped holes can lead to a large enhancement of pressures near the edges. Rectangular holes can have a smaller enhancement and lead to a quite small slope or variation of the stress near the centre of the structure. Advantageously, an exemplary optimal shape of the holes having a small pressure enhancement factor, in particular having low stresses and/or no or rounded edges, on one hand and having a large area of almost constant inhomogeneous stress near the center of the structure shall be chosen. However, the use of circular holes can have the advantage that they can be manufactured easily and with highest precision.

ii) Application of pressure inside the holes: A glass body with two holes per cross section as described above can be used, and the pressure can be applied in the holes. This can be advantageous for the measurement effect, but it is not possible to protect such a structure against overpressure, in particular for large pressures above ~80 bar. As an idea, protection against overpressure may be effected by applying pretension to the glass body, e.g. by shrinkage of an outer body which is e.g. made of steel.

iii) Setup with parallel pressure chambers instead of a serial configuration: An alternative setup without structuring of the glass body is shown in FIG. 5. One pressure is applied at the upper and lower quarter surface, the other pressure at the right and left one quarter surface of the glass body. This configuration does not have a large enhancement factor, but allows to rather directly measure the differential pressure. An exemplary advantage is the very simple shape of the cylindrical body without any need for holes in the glass body. Thereby errors resulting from deviations from the ideal symmetry of the glass body can be reduced or even eliminated. Furthermore, the difference pressure can be directly transferred to the measurement effect, since the birefringence at each position depends directly on the differential pressure applied, and there is no need to induced the difference of phase shifts at spatially separated parts as in the above designs. As an alternative, the pressure chambers can be surrounded completely by a steel housing, which can have a cylindrical inner surface, and then this housing is shrunk onto the glass block (see FIG. 5). Thermal tensions between housing and glass should be kept low by ensuring a highly symmetrical configuration during production and/or during operation. Possibly, compensation schemes can be applied (e.g. by mechanical or thermal after-treatment of the sensor, or by signal correction) to cope with residual built-in stresses from asymmetries.

iv) Use of mirrors: In order to shorten the length of the device and increase the magnitude of the measurement effect of pressure-induced birefringence, one can use mirrors at the end and, for example, at the front of the metal body in order to let the light traverse the device multiple times. Thereby, the birefringence-induced phase shift is additive accordingly multiple times. Furthermore, this allows to have illumination and detection on one side, with cost reduction due to a single electronic board instead of two. On the other hand, the use of mirrors can slightly complicate the device and additional problems, e.g. intensity losses and symmetry of light beam with respect to the glass body, should be solved by appropriate measures (e.g. by improved beam alignment and beam collimation means).

v) Spatial separation of pressure chambers: In our suggested exemplary sensor device, the pressure sensor is made of a single block of glass. Alternatively, a small gap can be arranged between the two blocks which are designed for application of the pressures p1 and p2 in order to eliminate mechanical cross-talk of tension between both blocks. The advantage of using a single block with two pressure sections is that the cross-talk can be eliminated by means of a larger separation layer between both sections, and that errors due to misalignment do not occur for a single block. A third alternative, two blocks possibly connected by fiber optics at different locations e.g. for level measurement, is possible. However, errors due to temperature differences between the two measurement points or regions should be eliminated, which is in principle possible.

Phase Shift and Signal Generation

The dependence of the light intensity on pressure-induced birefringence or phase shift, respectively, for perpendicular polarization filters has been given in the above equation. In the special case of the disclosed sensor, the main stress directions are given by the z- and y-direction. Hence we may set the angle $\beta=0$. Furthermore, an additional phase shift of $\pi/2$ is created by the quarter wave plate in order to guarantee a monotonous signal in differential pressure. This can lead to an intensity in the first detector given by $$I_1 = I^0 (1-\sin(\delta))/2.$$

Here $I^0$ is the initial light intensity incident on the device, wherein losses at surface interfaces etc. are neglected. For the second detector, the polarization filter before the detector is parallel to the filter before the device (i.e. at an angle of +45°). The intensity on this sensor, including the quarter wave plate, equals $$I_2 = I^0 (1+\sin(\delta))/2.$$

The difference of the two detector signals divided by their sum can be used as a signal S for the measurement of pressure or pressure-induced birefringence:

$$S = \frac{I_1 - I_2}{I_1 + I_2} = \sin(\delta).$$

Due to the quarter wave plate we have the sine instead of a cosine allowing to measure the sign of the phase shift and hence the differential pressure. The signal S does not depend on the intensity of the light source.

Pressure Range and Sensitivity

Pressure sensitivity and the appropriate pressure range for a sensor fulfilling the relevant accuracy requirements can be calculated from the phase shift as a function of pressure. We assume that the detector reaches a signal to noise ration SNR of $10^6$ at full scale (wherein maximum or full scale of the signal is 1; we use an optimistic SNR as the maximal signal encountered will be <1). The detector signal is given by the above formula for S with the phase shift:

$$\delta = K_d \delta p,$$

The sensitivity s of the signal S with respect to differential pressure $\delta p$ (also named dp) is hence given by $$s = \frac{\partial S}{\partial \delta p} = K_d \cos(K_d \delta p).$$

Figure 7:
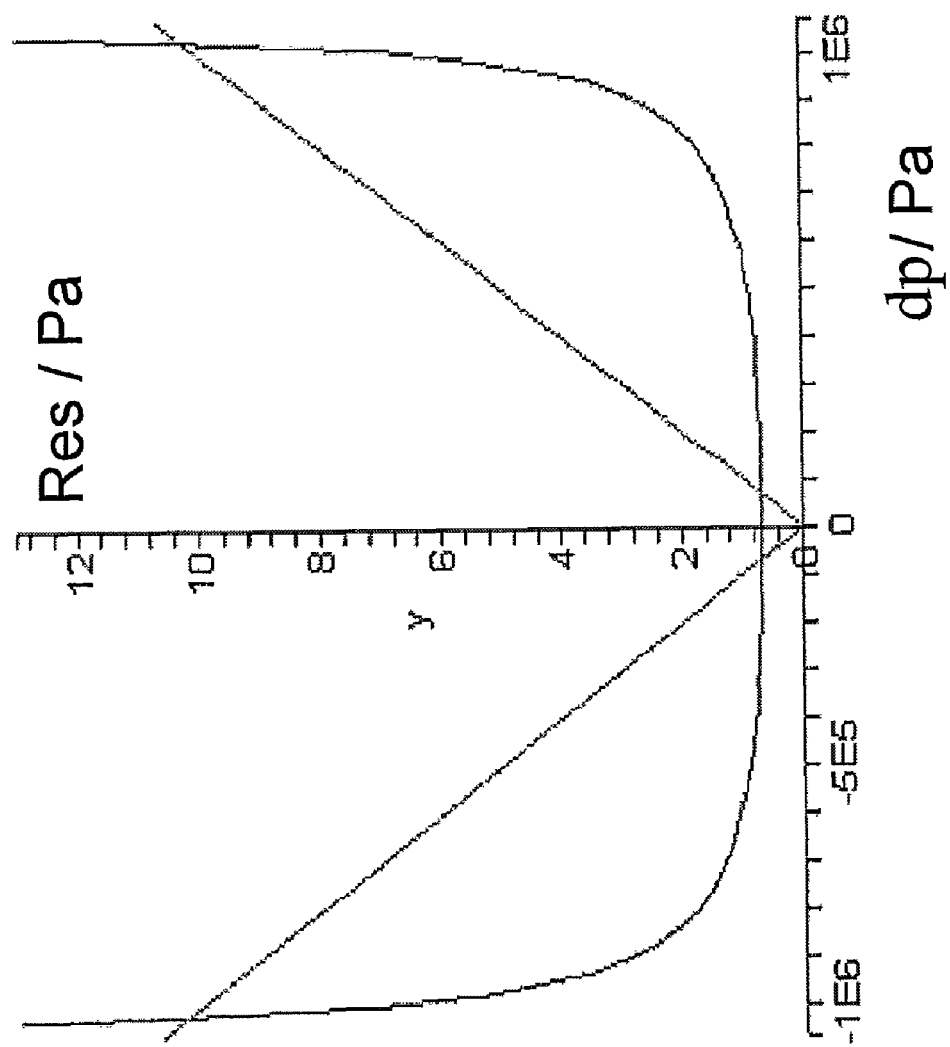
FIG. 7 shows an exemplary pressure resolution (in Pa) as a function of differential pressure (Pa) for reference conditions, wherein the u-shaped (quasi-parabolic) curve indicates a calculated pressure resolution and the v-like linear curves indicate an exemplary goal of $10^{-5}$ of the differential pressure for comparison.

The admissible pressure range can be found, for example, as follows: the pressure resolution Res at a given differential pressure dp is given by the inverse of the sensitivity s multiplied with the signal to noise ratio of the detection setup. In FIG. 7, the pressure resolution Res (in Pascal) is plotted as a function of (differential) pressure dp (in Pascal) by the u-shaped (quasi-parabolic) curve. For the maximum admissible pressure (upper pressure limit) and all smaller pressures, the resolution shall be less than e.g. $10^{-5}$ of the upper pressure limit. This pressure resolution target for the differential pressure dp is represented in FIG. 7 by the v-like linear curves. This implies that for the upper pressure limit the u-shaped (quasi-parabolic) curve has to lie below the v-like linear curve in FIG. 7, thus defining the admissible pressure range. Due to the shape of the u-shaped curve, for a fixed upper pressure limit chosen in this pressure intervall, the error for all pressures smaller than this upper pressure limit is smaller than the error at the upper pressure limit and hence also fulfills the required resolution criterion. FIG. 7 hence shows that the upper pressure limits may be chosen within the pressure interval between the two intersection points of the u-shaped and v-shaped curve in FIG. 7, i.e. between 0.68 bar (lower pressure limit, which is noise-limited) and 10.2 bar (upper pressure limit, which is pressure-measurement-range limited). If other pressure intervals are desired, the length of the sensor shall be adapted.

Summarizing Conclusions:

A homogeneous solid-state body, which is transparent for light, can be used for differential pressure sensing using pressure-induced birefringence in the sensor body. If a force or pressure acts on the body such that the refractive index of the material is changed due to induced stress, the propagation of parallel or minimally divergent light which is sent through the body is altered. A possible embodiment of the sensor body is a structured glass body. The sensor can be made from a cylindrical structure comprising (e.g., consisting of) two identical structures glass rods which are coaxially fused together and rotated by 90° with respect to one another. The inner part of the glass rod can be structured with holes such that it very efficiently transforms pressure into an inhomogeneous stress state in the center of the rod. This inhomogeneous stress state can lead to birefringence of the light propagating at the center of the rod which birefringence can be measured.

Exemplary embodiments use a larger body and not of a fiber, wherein the material of the larger body can be homogeneous compared to optical glass fibres having a core and cladding. Thus, temperature-induced stress due to expansion of different materials, including differently doped materials, as present in optical fibers, can be eliminated. Moreover, by using a larger body the coupling of light into the body can be facilitated.

Pressure dependent birefringence of a structured glass body can be used to measure differential pressure. In this document, we have shown that the setup is suitable as primary sensing element for industrial pressure sensors. A specific exemplary sensor is physically built, modelled and its performance is estimated. It is found that the proposed sensor having a length <6 cm can be used for measuring ranges between 0.68 bar and 10.2 bar with the required resolution. For other pressure ranges the geometry of the sensor can be easily adapted. Overpressure of up to 250 bar (static pressure) and 92 bar (differential pressure) are possible; these limits can be increased by optimizing the geometry. Power consumption of the optical pressure sensor is within the limits desired for a 4-20 mA device.

The specifications for the symmetry of the device and light beam can be important. In order to keep expected errors low, the glass body should be manufactured with high accuracy.

Thus, it will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

LIST OF REFERENCE NUMERALS 1 light source, LED
2 light beam
3 polarisation filter 45°
4 housing of sensing element
5 steel casing
6 terminal walls
7 separating wall between pressure chambers, seal
8 first pressure chamber
9 second pressure chamber
10 (structured) glass body
11 first part of glass body
12 second part of glass body
13 cross-section of first part of glass body
14 cross-section of second part of glass body
15 quarter wave plate
16 polarising beam splitter oriented at 45° within the x/y plane
17, 17' first and second detectors, respectively
18 pressure sensor
19 holes in first part of glass body
20 holes in second part of glass body
21 light with polarisation direction 45° within the x,y-plane
22 light beam exiting the glass rod
23, 24 two orthogonal components of 22
25 steel walls of pressure chambers
26 central axis
27 terminal planes of glass body
p1 pressure in first pressure chamber
p2 pressure in second pressure chamber
$I_1$ intensity measured in first detector
$I_2$ intensity measured in second detector
δp, dp pressure difference, differential pressure
$\delta_p$ differential-pressure-induced phase shift between x and y linear polarization components of the travelling light Ax amplitude of the x component
Ay amplitude of the y component
λ wavelength of the light
K stress-optical constant
L rod length
σ stress in the respective direction ($\sigma_{xx}$, $\sigma_{xy}$, $\sigma_{yy}$)
t time; thickness of steel casing
E Young modulus of elasticity
ν Poisson number
d1 length of hole
d2 distance of bottom of hole from P
d3 distance of first pressure chamber from terminal end
d hole diameter
b distance of centre of hole from central axis
D diameter of glass body
P separating plane
h width of pressure chambers
A, B cross-sections
Res pressure resolution

What is claimed is:

1. Pressure sensor with at least one optical sensing element for sensing the pressure induced changes in birefringent properties of the optical sensing element, wherein the pressure sensor comprises:
at least one single-material transparent body having at least two different regions for subjecting at least two different pressures (p1, p2) to at least two pressure chambers, the transparent body being configured for transmitting by a parallel or essentially non-divergent or low-divergent light beam without total reflection in said body such that a birefringence-induced phase shift of a transmitted light beam will depend on a difference of the two different pressures (p1, p2).

2. Pressure sensor according to claim 1, wherein the transparent body is located for being directly subjected to the at least two different pressures (p1, p2).

3. Pressure sensor according to claim 1, wherein the transparent body is a cylindrical body which is subjected to the at least two different pressures (p1, p2) in at least two longitudinally subsequent parts, and/or to two different pressures (p1, p2) in at least four equiangular alternating-pressure sections along a full length of the body.

4. Pressure sensor according to claim 1, wherein the transparent body is a cylindrical body with circular cross-section with two parts of equal length, wherein the two parts comprise:
an essentially identical internal structure formed as longitudinal openings leading to an asymmetric stress distribution in the body, where pressure is applied, and wherein the two parts are rotated relative to one another by 90° around a principal axis of the cylindrical body.

5. Pressure sensor according to claim 4, wherein in each part the internal structure is a pair of longitudinal holes, axes of which are equally distanced from the principal axis of the cylindrical body, and the axes of which are oriented in one same plane including the principal axis of the cylindrical body.

6. Pressure sensor according to claim 4, wherein a diameter (d) of the longitudinal holes is between ⅛ and ⅓ of a diameter (D) of the cylindrical transparent body.

7. Pressure sensor according to claim 4, wherein the transparent body has terminal surfaces perpendicular to the principal axis, and wherein the two parts are arranged adjacent to each other in a butt joint.

8. Pressure sensor according to claim 1, wherein the parallel or minimally divergent light beam travels along a central longitudinal axis of the transparent cylindrical body with terminal planes oriented perpendicular to a central longitudinal axis of the transparent body.

9. Pressure sensor according to claim 1, comprising:
a light source for irradiating the transparent body with the light beam parallel to and/or along a central longitudinal axis of the transparent body from one side; and
two detectors on another side of the transparent body for detecting transmitted light leaving the transparent body, wherein the detectors measure a total integrated intensity within a certain spectral range, and wherein the detectors are detector diodes which are connected to provide an output that includes a difference signal.

10. Pressure sensor according to claim 9, comprising:
an optical phase shift element for passing the light beam behind the transparent body via a quarter wave plate.

11. Pressure sensor according to claim 9, comprising:
at least one of a temperature measurement sensor and a light intensity sensor for measuring intensity of the light source to provide additional data for evaluation of a differential pressure.

12. Pressure sensor according to claim 9, wherein the light beam is linearly polarised using a polarisation filter, and wherein the light beam when leaving the transparent body is split into two components by a polarising beam splitter with a same orientation as the polarisation filter for detection by the two detectors.

13. Pressure sensor according to claim 1, comprising:
two identical, longitudinally spaced, circumferential pressure chambers which are filled with a liquid for receiving the two different pressures (p1, p2).

14. Pressure sensor according to claim 1, wherein the transparent body is a glass body made of fused silica.

15. Pressure sensor according to claim 1, comprising:
an outer casing for the transparent body, the pressure chambers being in an interspace between an outer surface of the transparent body and an inner surface of the outer casing.

16. Pressure sensor according to claim 15, wherein the outer casing is made of steel having an essentially equal or at least similar temperature expansion characteristic as the transparent body, and wherein the transparent body is fixed within the outer casing by at least one of hard soldering or by a flexible O-ring.

17. Pressure sensor according to claim 16, wherein the pressure chambers are provided with rounded edges.

18. Pressure sensor according to claim 1, wherein the transparent body is unstructured internally in a region where a separating wall between the pressure chambers, and/or where a housing is attached or contacts the transparent body, to address an influence of thermal stresses on birefringence.

19. Pressure sensor according to claim 1, wherein the transparent body comprises:
two structured halves which are spatially separated.

20. Pressure sensor according to claim 1, comprising:
a light emitting diode for providing the light beam, which is modulated in intensity; and
a polorisation filter for passing the light beam prior to transmission through the transparent body.

21. Pressure sensor according to claim 1, wherein the difference of the two pressures is in a pressure range above 0.5 bar up to 15 bar.

22. Method for detecting a pressure using a pressure sensor with at least one optical sensing element to sense pressure induced changes in birefringent properties of the optical sensing element, the method comprising:

subjecting at least one single material, transparent body to at least two different pressures (p1, p2) in at least two different regions via at least two pressure chambers;

transmitting a light beam to the transparent body by a parallel or minimally divergent light beam without total reflection in said body such that a birefringence-induced phase shift of the light beam depends on a difference of the two different pressures (p1, p2); and revaluating differential pressure in the two pressure chambers based on at least one of a sum or difference output of these detectors, and a ratio of the output of these detectors.

* * * * *